UNITED STATES PATENT OFFICE.

HARRY A. KUHN, OF EDGEWOOD, MARYLAND.

ANTIDIMMING COMPOSITION.

1,394,773. Specification of Letters Patent. Patented Oct. 25, 1921.

No Drawing. Application filed January 24, 1921. Serial No. 439,665.

(FILED UNDER THE ACT OF MARCH 3, 1883, 22 STAT. L., 625.)

*To all whom it may concern:*

Be it known that I, HARRY A. KUHN, a citizen of the United States of America, and resident of Edgewood, Maryland, have invented certain new and useful Improvements in Antidimming Compositions, of which the following is a specification.

This application is made under the act of March 3, 1883, chapter 143 (22 Stat., 625) and the invention herein described and claimed may be used by the Government of the United States or any of its officers or employees in the prosecution of work for the Government, and any person in the United States without the payment to me of any royalty thereon.

This invention relates to a composition for preventing the dimming of glass surfaces, such as windows, wind shields, lenses and the like.

Among the objects of this invention is the provision of a composition which, when applied to a glass surface, will prevent the accumulation of moisture thereon and will break up the surface tension of globules of moisture condensing upon such surface, thereby causing the liquid to flow down the surface of the glass in a substantially uniform film.

Another object of this invention is to provide a composition which will prevent the condensation and accumulation of moisture upon other surfaces than glass, such as metallic surfaces, etc.

A still further object of this invention is to provide a composition, such as above described, which is also capable of being taken up by a cloth, felt, or fabric, the saturated or impregnated fabric to be applied to a surface by rubbing the surface therewith and thereby applying to such surface the anti-dimming composition.

In preparing said composition, I use a salt of a sulfonated vegetable oil and add thereto an alkali with small quantities of a binding material and a mineral oil. Water in sufficient quantity to make a paste or liquid is also added. The ingredients are heated to about 100° C. until a homogeneous mass is formed.

Among the salts of the sulfonated vegetable oils which I have found suitable for this purpose are those of rape oil, cotton seed oil, corn oil, linseed oil and castor oil. I have found, however, that the best results are obtained by using the alkali metal salts of sulfonated rape or cotton seed oils, or mixtures of these. For alkalis the most suitable are the caustic alkalis.

As a binding material, I have found glycerin very satisfactory, especially, if the composition is to be made into cakes or soaked into cloth. Sodium silicate also acts well as a binder and when used with glycerin for this purpose improves the composition.

The mineral oil which I have found most suitable for this purpose is engine oil; however, other mineral oils may be substituted therefor. The function of the mineral oil is to give the anti-dimming composition a softer finish and it also adds to the permanency of the film.

A specific example of my composition is as follows:—

| | |
|---|---|
| Sodium salt of sulfonated rape oil | 80–100 parts |
| NaOH | 15–30 " |
| Sodium silicate | 3–5 " |
| Glycerin | 3–5 " |
| Engine oil | 3–5 " |
| Water | 25–100 " |

These substances are heated together until a homogeneous mass is obtained and the mixture allowed to cool, and prepared either in the form of cakes or paste, or else soaked into cloth for use.

This invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

What I claim is:

1. An anti-dimming composition comprising the reaction products of a salt of a sulfonated vegetable oil, an alkali, a mineral oil and a binder.

2. An anti-dimming composition comprising the reaction products of an alkali metal salt of a sulfonated vegetable oil, caustic alkali, mineral oil and a binder.

3. An anti-dimming composition comprising the reaction products of an alkali metal salt of a sulfonated vegetable oil, caustic alkali, mineral oil and glycerin.

4. An anti-dimming composition comprising the reaction products of an alkali metal salt of a sulfonated vegetable oil, caustic alkali, mineral oil, glycerin and a soluble silicate.

5. An anti-dimming composition comprising the reaction products of a salt of sulfonated rape oil, an alkali, a mineral oil and a binder.

6. An anti-dimming composition comprising the reaction products of salts of sulfonated rape and cotton seed oils, an alkali, a mineral oil and a binder.

7. An anti-dimming composition comprising the reaction products of an alkali metal salt of sulfonated rape oil, caustic alkali, soluble silicate, glycerin, engine oil and water.

8. An anti-dimming composition comprising the reaction products of an alkali metal salt of sulfonated vegetable oil 80–100 parts, alkali 15–30 parts, mineral oil 3–5 parts and binder 3–5 parts.

9. An anti-dimming composition comprising the reaction products of an alkali metal salt of sulfonated rape oil 80–100 parts, caustic alkali 15–30 parts, water glass 3–5 parts, glycerin 3–5 parts, engine oil 3–5 parts, and water 25–100 parts.

10. A fabric impregnated with a composition comprising the reaction products of a salt of a sulfonated vegetable oil, an alkali, a mineral oil and a binder.

11. A fabric impregnated with a composition comprising the reaction products of an alkali metal salt of sulfonated rape oil, caustic alkali, soluble silicate, glycerin, engine oil and water.

HARRY A. KUHN.